T. J. THATCHER.
TIRE.
APPLICATION FILED JULY 12, 1911.
1,007,015.
Patented Oct. 24, 1911.
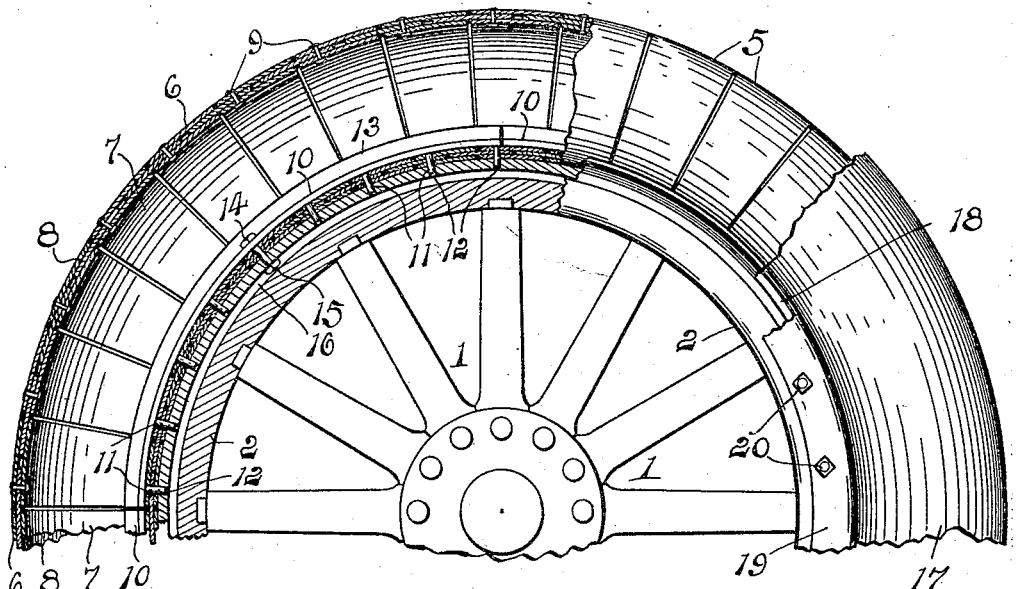
FIG.1.
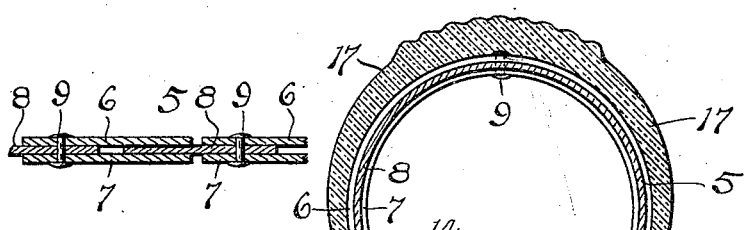
FIG.3.
FIG.2.
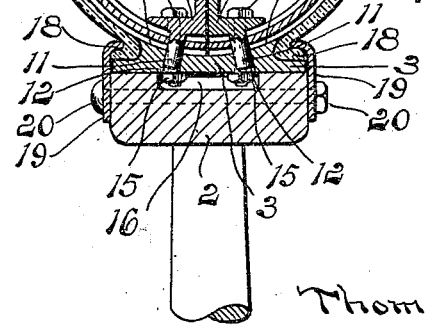
Witnesses
Chas. W. Stauffiger
Anna C. Raviler
Inventor
Thomas J. Thatcher
By
Attorney

UNITED STATES PATENT OFFICE.

THOMAS J. THATCHER, OF DETROIT, MICHIGAN, ASSIGNOR OF ONE-THIRD TO FRANK B. THATCHER AND ONE-THIRD TO JAMES GRAY, BOTH OF DETROIT, MICHIGAN.

TIRE.

1,007,015.

Specification of Letters Patent. Patented Oct. 24, 1911.

Application filed July 12, 1911. Serial No. 638,069.

*To all whom it may concern:*

Be it known that I, THOMAS J. THATCHER, a citizen of the United States of America, residing at Detroit, in the county of Wayne and State of Michigan, have invented certain new and useful Improvements in Tires, of which the following is a specification, reference being had therein to the accompanying drawings.

This invention relates to improvements in resilient tires for vehicles of that class in which the tubular structure is formed of a series of spring members and its object is to provide certain new and useful features in the construction and arrangement of parts, the invention consisting in the matters hereinafter set forth and more particularly pointed out in the claims, reference being had to the accompanying drawings, in which—

Figure 1 is a side elevation of a portion of a wheel showing a tire thereon embodying the invention and partially in section to show the construction; Fig. 2 is an enlarged transverse section of the same; and Fig. 3 is a sectional detail illustrating the arrangement of the spring members.

As shown in the drawing 1 represents a wheel of the ordinary construction having a felly 2 upon the periphery of which is secured in any suitable manner a metal rim 3. The outer side of this rim forms a concave seat 4 for a series of flat steel spring members bent into circular form and together forming a continuous tubular structure. This tubular structure or tire is formed of three layers or series of these flat steel spring members 5. The members of the outer series 6 are arranged side by side with spaces between their adjacent edges and the inner series 7 is similarly arranged and spaced from the outer series the thickness of the intermediate series 8 which is arranged between the inner and outer series to break joints therewith. The inner and outer series of members are thus arranged in pairs and the members of each pair are secured together with one of the members of the intermediate series secured between them, by means of a rivet 9 passing through the members of each pair and through the member of the intermediate series. The members of the intermediate series are each secured along one edge between the pairs of members of the inner and outer series and project between the adjacent pair of members to slide freely so that when the tire is compressed and the springs yield inwardly, each pair of members with the intermediate member secured between them may be free to move relatively to the adjacent pairs of members. The spring members are preferably secured together by the rivets 9 along the tread of the tire and the spring members are held to the wheel rim 3 with their ends abutting, by pairs of ring segments 10 fitting the curvature of the inner face of the tire adjacent to the rim and provided with studs 11 to engage holes in the ends of the springs and project therethrough into engagement with holes 12 provided therefor in the rim 3. The pairs of segments are provided with outwardly projecting strengthening ribs 13 along their adjacent sides and each segment is secured in place by means of one or more bolts 14 passing through openings provided therefor in the segments, through similar openings in the ends of the springs beneath and through holes in the rim 3 where they are provided with nuts 15 on their inner ends within a recess 16 formed in the felly 2. The ends of the springs are thus firmly clamped to their seat upon the rim by the ring segments and are securely held by the studs 11. The ring segments are made in pairs with studs upon one member of each pair to engage the openings in the ends of the springs at one side and the other member of the pair is provided with studs to engage the openings in the abutting ends of the springs at the other side of the tire. The assembling of the tire is thus greatly facilitated. This arrangement of the springs gives a smooth, even outer surface to support an outer casing 17 of rubber or other suitable material which is provided with ribs 18 along its edges to engage beneath clip plates 19 secured to the sides of the felly by means of bolts 20.

The large number of flat springs arranged in interlocking relation and free to slide upon each other, give great resiliency and strength to the tire and the particular manner of securing these springs to the rim facilitates the assembling of the device and insures the springs against displacement under heavy load.

Having thus fully described my invention what I claim is:—

1. A resilient tire comprising an inner and an outer series of flat spring members bent to form a tubular structure and arranged in pairs, a series of spaced intermediate flat spring members between the inner and outer series and each member thereof arranged with its edges between the edges of adjacent pairs of members, a rivet passing through openings in each pair of members and through an opening in the intermediate member to secure the three members together with the intermediate member free to slide between the adjacent pair of members, a wheel rim, and means for securing the ends of said spring members to said rim.

2. A resilient tire comprising a series of flat spring members having openings near their ends and each bent to bring its ends into abutting relation, a wheel rim formed with a seat for the abutting ends of said members and provided with a series of holes, ring segments arranged in pairs to engage the inner surfaces of the abutting ends of the members, studs on the ring segments engaging the holes in the spring members and in the rim, and means for securing the ring segments to the rim to clamp the ends of the spring members.

In testimony whereof I affix my signature in presence of two witnesses.

THOMAS J. THATCHER.

Witnesses:
C. R. STICKNEY,
ANNA C. RAVILER.